US00RE35634E

United States Patent [19]

Oat

[11] E Patent Number: Re. 35,634

[45] Reissued Date of Patent: *Oct. 21, 1997

[54] METHOD OF STONE WASHING FABRIC WITH A SYNTHETIC ABRASIVE STONE

[76] Inventor: Henry C. Oat, P.O. Box 9307, Santa Fe, N. Mex. 87504

[ * ] Notice: The portion of the term of this patent subsequent to Nov. 30, 2010, has been disclaimed.

[21] Appl. No.: 457,379

[22] Filed: Jun. 1, 1995

Related U.S. Patent Documents

Reissue of:

[64] Patent No.: 5,359,745
Issued: Nov. 1, 1994
Appl. No.: 135,761
Filed: Oct. 12, 1993

U.S. Applications:

[63] Continuation of Ser. No. 889,452, May 27, 1992, Pat. No. 5,266,087.

[51] Int. Cl.[6] ..... D06B 3/10

[52] U.S. Cl. ..... 8/159; 51/293

[58] Field of Search ..... 501/17, 39; 51/293, 51/307–309; 8/479, 114.6, 115, 139, 159

[56] References Cited

U.S. PATENT DOCUMENTS

| | | | |
|---|---|---|---|
| 3,945,816 | 3/1976 | Johnson | 65/22 |
| 3,963,503 | 6/1976 | MacKenzie | 106/40 |
| 4,018,575 | 4/1977 | Davis et al. | 51/295 |
| 4,071,983 | 2/1978 | Thielen | 51/393 |
| 4,347,326 | 8/1982 | Iwami et al. | 501/39 |
| 4,421,526 | 12/1983 | Strickman et al. | 51/296 |
| 4,842,619 | 6/1989 | Fritz et al. | 51/295 |
| 4,904,280 | 2/1990 | Cygan et al. | 51/296 |
| 4,912,056 | 3/1990 | Olson | 435/263 |
| 4,933,306 | 6/1990 | Pietsch | 501/39 |
| 4,951,366 | 8/1990 | Geller | 26/28 |
| 4,954,138 | 9/1990 | Butcher et al. | 51/293 |
| 5,209,816 | 5/1993 | Yu et al. | 156/636 |

*Primary Examiner*—Deborah Jones
*Attorney, Agent, or Firm*—Robert W. Becker & Associates

[57] ABSTRACT

Synthetic abrasive stones and method for making same. A mixture of glass and 10–20% by weight foaming agent is provided. The mixture is heated to a temperature of from 788° to 899° C., and is then cooled to room temperature.

18 Claims, No Drawings

METHOD OF STONE WASHING FABRIC WITH A SYNTHETIC ABRASIVE STONE

Matter enclosed in heavy brackets [ ] appears in the original patent but forms no part of this reissue specification; matter printed in italics indicates the additions made by reissue.

This application is a continuation of application Ser. No. 07/889,452 filed May 27, 1992, now U.S. Pat. No. 5,266,087.

Background of the Invention

1. Field of the Invention

This invention relates to novel synthetic abrasive stones based on a novel foamed glass composition and method for making the same based on waste glass, foaming agents, binders and mixtures thereof. This invention also relates to the novel use of said synthetic abrasive stone to replace pumice in the process known as "stone-washing" as used in the garment industry. Pumice is added to the washing process to soften, and abrade, the fabric, and to impart variations in the appearance of the fabric. Pumice is often impregnated with bleach and various chemicals which are released during the washing cycle to create variations in the appearance of the fabric. This process results in treatments of fabric known to the industry as "acid washed", "ice washed", "electric washed", etc. The present invention in particular relates to a method of stone washing fabric.

There are many disadvantages associated with the use of pumice for stone washing. 1) Mined pumice varies widely in its density, abrasive qualities, absorptive qualities and in the size of the stones, making it difficult to maintain a supply of consistent material to the industry. A wide range of these variations occur from mine site to mine site and often times within one site. 2) Locations of pumice that are deemed suitable by the garment industry are very limited. The majority of the pumice used by the industry is imported from Turkey, Greece, Ecuador, and Indonesia, at great expense. 3) Great environmental damage results from strip mining pumice. 4) Due to the high attrition rate of pumice in the stone washing process, the broken down pumice or sludge must be trapped and then hauled to a land fill at great expense. As a result of the problems associated with using pumice for stone washing, there has been a growing demand for a consistent less expensive replacement material. This has resulted in much experiment ranging from the use of bottle caps to pumice grit mixed with cement. These attempts have proved to be largely unsuccessful.

Foamed glass can be made into synthetic abrasive stones and can be used as a substitute for the pumice that is currently used by the garment industry, resulting in better abrasion, lower attrition rate, good absorptive properties, and significantly lower cost. The desirable properties of foamed glass can be widely varied and manufactured with consistency to meet the garment industry's needs. Foamed glass can also be molded into a block to fit over the agitation fins of the washing machine which would further lower the attrition rate and eliminate the need to pick pumice out of the pockets of the finished garments. The trapped grit or sludge resulting from the use of foamed glass synthetic stones for stone washing can be remade into said stones. Synthetic abrasive stones made from waste glass can provide a significant market for recycled glass, which is currently very limited.

2. Prior Art

Foamed glass has long been known as a heat and sound insulating material. Prior art in this field is extensive and has been the subject of many patents. The National Technical Information Service, Publication No. AD/A-05 819, Demidevich, Manufacture and Uses of Foam Glass, discloses many methods for making foamed glass and foamed glass compositions utilized throughout the world up through 1972. The subject of most of the patents and research in the field relates to improved methods of manufacture and improved glass compositions. The object of these improvements is to produce a material that is extremely low in density, that provides for good heat and sound insulating properties, is impervious to water, and is acid resistant. Other uses of foamed glass relate to a skin or glazed surface composition used as a building facing material, an aggregate or filler material used in construction products, the making of blocks or tiles for construction purposes, and as a filtering material.

Foamed glass can be produced utilizing many methods of production and numerous glass and foaming agent compositions. These include, by way of example only, glass compositions comprising waste glass (including waste foamed glass), soda lime glass, borosilicate glass or aluminosilicate glass, and foaming agents such as carbonates and sulfates of the various alkali and alkaline earth metals such as calcium carbonate, potassium carbonate, sodium carbonate, barium carbonate, strontium carbonate and the like, and calcium sulfate, potassium sulfate, sodium sulfate, barium sulfate, strontium sulfate and the like as well as carbon black, sulfur, dolomite and the like.

Summary of the Invention

The present invention features synthetic abrasive stones and a method of making same using ground recycled glass, a foaming agent, a binder and sufficient moisture to form a stone by mechanical means. The stones are then fired in a kiln or furnace to a sufficient temperature to cause the glass to soften and foam. The stones are then annealed and brought to room temperature. It is an object of this invention that the resulting product has better abrasive qualities than pumice, has a lower attrition rate than pumice, i.e., it does not break down as rapidly in the stone wash process, and has significantly lower cost than pumice currently used by the garment industry.

The invention focuses on using waste or recycled glass typically of the soda lime composition. Glass of this type can be obtained from pre or post consumer sources and is abundantly available at nominal costs. Calcium carbonate has been chosen as the foaming agent, also because of its low cost. The novelty of this composition lies in the high percentage of calcium carbonate used for foaming. Traditional foamed glass composition cite using only 10% or less foaming agent, with the majority of useful compositions containing 2% or less foaming agent. This is especially true where calcium carbonate is the foaming agent. See, for example, U.S. Pat. No. 3,963,503 McKenzie, U.S. Pat. No. 4,347,326 Iwami et al, and U.S. Pat. No. 3,945,816 Johnson. One of the main objects of this invention is to produce a foamed glass of higher density, with excellent abrasion, and good absorptive properties. This has been achieved by raising the percentage of foaming agent to between 10% to 20% by weight, resulting in a foamed glass having a density of between 0.46 gm/cc and 0.70 gm/cc, depending on the percentage of foaming agent used. The synthetic abrasive stones formed by this method provide for a consistent product to the garment industry that has heretofore not been available. Formulations of the product can also be varied to provide for specific abrasive needs. It should be noted that the prior art teaches that a uniform pore size or cell structure is preferable. The cell structure of this invention, as set forth in the preferred embodiment, is markedly uneven, ranging from 0.1 mm to 6 mm.

Bentonite clay is added to the ground glass and foaming agent mixture to act as a binder along with sufficient water to mechanically form a solid, stable "stone", able to withstand the handling and firing process. Bentonite clay was chosen as a binder because of its low cost and excellent binding properties throughout the manufacturing process.

The ground glass, foaming agent, binder, and water are mixed together and mechanically pressed into stones. This can be accomplished by hydraulic die presses, briquetting machines and the like or by extrusion. The stones are then conveyed to a tunnel furnace where they are fired to a sufficient temperature to foam, then annealed and cooled to room temperature. The stones are then tumbled briefly to remove any sharp edges.

Alternatively, for example to make a block to fit over the agitation fins of a washing machine, the ground glass and foaming agent mixture can be added to a mold, for example a covered stainless steel mold, which is subsequently heated to a foaming temperature and cooled.

DESCRIPTION OF PREFERRED EMBODIMENTS

A novel synthetic abrasive stone and method for making said stone is based on, but not limited to, the use of waste or recycled glass, having an average composition of $SiO_2$-72.5%, $Al_2O_3$-0.4%, CaO-9.75%, $Na_2O$-13.7%, MgO-3.3%, $K_2O$-o.1%, (other oxides less than 1%), calcium carbonate ($CaCO_3$) as foaming agent, and Bentonite clay as a binder or mixtures thereof as the principal components of said stones.

In the preferred method, the crushed waste, or recycled glass of said average composition, hereafter referred to as glass, is further reduced to a granular state by impact crushing and further reduced to a powder by ball milling. The glass is ball milled until it will pass a 150 mesh screen and preferably a 325 mesh screen. $CaCO_3$, also preferably passing a 325 mesh screen, is then added to the glass as a percentage of the total weight. The percentage of $CaCO_3$ is between, but not limited to, 10% and 20%, preferably 15%. Bentonite clay, in sufficient amount to act as a binder, approximately 6%, is added to the total weight of the glass and $CaC_3$ mixture along with sufficient moisture, approximately 6% water, to form said mixture into stones using a briquetting machine. The said stones can be made into a variety of shapes and sizes to meet the needs of the garment industry. Currently, the industry uses irregularly shaped pumice stones ranging from approximately ¾" in diameter to 3" in diameter, depending on the desired treatment of the fabric.

The said stones are then rapidly heated in a tunnel furnace to between 788° C. and 899° C., with the optimal temperature being 830° C., at which temperature the stones are held in residence for a period of time ranging from 5 min to 30 min. with 20 min. being optimal to thoroughly foam the stones. The stones are rapid cooled to 538° C., the annealing temperature, and then slow cooled to room temperature. The stones are then tumbled to remove any sharp edges and separate any stones that have stuck together.

EXAMPLE 1

A batch was prepared from the following ingredients:

a. 85 pounds of powdered recycled glass having an average composition of $SiO_2$-72.5%, $Al_2O_3$- 0.4%, CaO-9.75%, $Na_2O$ - 13.7%, MgO- 3.3%, $K_2O$-0.1%, (other oxides less than 25%) passing a standard U.S. 325 mesh screen.

b. 15 pounds of CaC% also passing a 325 mesh screen, representing 15% of the total weight.

c. 6 pounds of bentonite clay, passing a 325 mesh screen, representing 6% added to the total weight.

d. 2.72 liters of water added to the total weight representing 6% water.

The ingredients were thoroughly mixed together and pressed in a briquetting machine. The briquettes were then fired in a kiln to 830° C., where they resided for 20 min. and then allowed to slow cool to room temperature. The resulting briquette had a bulk density of approximately 0.68 gm/CC.

EXAMPLE 2

A batch was prepared from the following ingredients:

a. 85 pounds glass of Example 1 b. 15 pounds $CaCO_3$ c. 6 pounds bentonite clay d. 25.23 liters of water

The ingredients were thoroughly mixed together and pressed into 1 ¼ oz. paper cups and vibrated to condense the mixture. The cups acted as a mold to form the "stones". The stones were then fired in a kiln to 830° C. where they resided for 20 min., rapid cooled to 538° C. and then slow cooled to room temperature. The resultant stone had a bulk density of approximately 0.68 gm/cc.

In trial production stone washing tests, the stones made by this method exhibited an attrition rate of 10.6% compared to the premium grade pumice currently used, for which the attrition rate is 37.7%.

EXAMPLE 3

A batch was mixed and fired as specified in Example 2 with the exception that the amount of $CaCO_3$ was 10 pounds or 10%. The resultant stone had a bulk density of 0.45 gm/cc.

In trial production stone washing tests, the stones made by this method exhibited an attrition rate of 27% versus 37.7% for pumice.

EXAMPLE 4

A batch was mixed and fired as specified in Example 2 with the exception that the amount of $CaCO_3$ was 13 pounds or 13%. The resultant stone had a bulk density of 0.65 gm/cc.

In trial production stone washing tests, the stones made by this method exhibited an attrition rate of 14.4% versus 37.7% for pumice.

EXAMPLE 5

A batch was mixed and fired as specified in Example 2 with the exception that the amount of $CaCO_3$ was 18 pounds or 18%. The resultant stone had a bulk density of 0.69 gm/cc.

In trial production stone washing tests, the stones made by this method exhibited an attrition rate of 16.7% versus 37.7% for pumice.

EXAMPLE 6

A batch was mixed and fired as specified in Example 2 with the exception that the amount of $CaCO_3$ was 20 pounds or 20%. The resultant stone had a bulk density of 0.72 gm/cc.

In trial production stone washing tests, the stones made by this method exhibited an attrition rate of 17.5% versus 37.7% for pumice.

EXAMPLE 7

A batch was prepared from the following ingredients:

a. 85 pounds glass of example 1 b. 15 pounds $CaCO_3$ c. 3.15 liters sodium silicate d. 25.23 liters water

The ingredients were thoroughly mixed and pressed into 1 ¼ oz. paper cups and fired as specified in Example 2. The resultant stone had a bulk density of 0.67 gm/cc.

In trial production stone washing tests, the stones made by this method exhibited an attrition rate of 12.3% versus 37.7% for pumice.

EXAMPLE 8

A batch was mixed and fired as specified in Example 7 with the exception that 25 pounds or 25% was replaced with pumice grit or sludge. The resultant stone had a bulk density of 1.62 gm/cc.

The present invention is, of course, in no way restricted to the specific disclosure of the specification and examples, but also encompasses any modifications within the scope of the appended claims.

What I claim is:

1. A method of stone washing fabric, comprising:

washing fabric with a synthetic abrasive stone comprising a foamed glass derived from a mixture of glass and [a] *from 10 to less than 20% by weight* foaming agent.

2. A method of stone washing fabric according to claim 1, wherein the glass is selected from the group consisting of waste glass, soda lime glass, borosilicate glass, aluminosilicate glass, and mixtures thereof.

3. A method of stone washing fabric according to claim 2, wherein the glass in the mixture is ground glass in a powder state.

4. A method of stone washing fabric according to claim 1, wherein the foaming agent is selected from the group consisting of carbonates and sulfates of the alkali and alkaline earth metals, carbon black, sulfur, dolomite, and mixtures thereof.

5. A method of stone washing fabric according to claim 4, wherein the foaming agent is selected from the group consisting of calcium carbonate, potassium carbonate, sodium carbonate, barium carbonate, strontium carbonate, calcium sulfate, potassium sulfate, sodium sulfate, barium sulfate, strontium sulfate, and mixtures thereof.

[6. A method of stone washing fabric according to claim 1, wherein the foaming agent comprises up to 20% by weight of the mixture.]

[7. A method of stone washing fabric according to claim 6, wherein the foaming agent comprises between 10 to 20% by weight of the mixture.]

8. A method of stone washing fabric according to claim 1, wherein the foaming agent is calcium carbonate, and the mixture contains 15% by weight thereof.

9. A method of stone washing fabric according to claim 1, wherein the cell structure of the synthetic abrasive stone is uneven.

10. A method of stone washing fabric according to claim 9, wherein the cell structure of the synthetic abrasive stone ranges from 0.1 mm to 6 mm.

11. A method of stone washing fabric according to claim 1, wherein the synthetic abrasive stone has a lower attrition rate than the attrition rate of pumice.

12. A method of stone washing fabric according to claim 1, wherein washing the fabric with the synthetic abrasive stone causes the synthetic abrasive stone to break down into grit or sludge.

13. A method of stone washing fabric according to claim 12, wherein the method further comprises trapping the grit or sludge resulting from the synthetic abrasive stone breaking down.

14. A method of stone washing fabric according to claim 1, wherein the fabric is denim.

15. A method of stone washing fabric in a washing machine having agitation fins, comprising:

fitting over the agitation fins in the washing machine a synthetic abrasive stone that has been molded into a block that fits over the agitation fins, the synthetic abrasive stone comprising a foamed glass derived from a mixture of glass and a foaming agent;

adding fabric to the washing machine; and washing the fabric in the washing machine so that it contacts the synthetic abrasive stone, thereby softening and abrading the fabric.

16. A method of stone washing fabric according to claim 15, wherein the glass is selected from the group consisting of waste glass, soda lime glass, borosilicate glass, aluminosilicate glass, and mixtures thereof.

17. A method of stone washing fabric according to claim 15, wherein the foaming agent is selected from the group consisting of carbonates and sulfates of the alkali and alkaline earth metals, carbon black, sulfur, dolomite, and mixtures thereof.

18. A method of stone washing fabric according to claim 15, wherein the foaming agent comprises up to 20% by weight of the mixture.

19. A method of stone washing fabric according to claim 18, wherein the foaming agent is calcium carbonate, and the mixture contains 15% by weight thereof.

20. A method of stone washing fabric according to claim 13, wherein the method further comprises remaking the trapped grit or sludge into a synthetic abrasive stone.

* * * * *